United States Patent [19]
Ferguson et al.

[11] 3,822,732
[45] July 9, 1974

[54] RESILIENT VEHICLE WHEEL WITH CORRUGATED TREAD WALL AND INWARDLY-DISHED CORRUGATED END WALLS

[75] Inventors: Hugo S. Ferguson; Frank E. Raymond, both of Averill Park, N.Y.

[73] Assignee: Air Cushion Vehicles, Inc., Poestenkill, N.Y.

[22] Filed: Oct. 16, 1972

[21] Appl. No.: 297,735

[52] U.S. Cl.................. 152/7, 152/40, 280/DIG. 7, 152/326
[51] Int. Cl............................................. B60b 9/10
[58] Field of Search.......... 301/5 R, 63 PW; 152/40, 152/42, 47, 320, 322, 326, 7, 323, 324, 325, 327, 5, 9; 180/119, 20, DIG. 7

[56] References Cited
UNITED STATES PATENTS

| | | | |
|---|---|---|---|
| 1,258,573 | 3/1918 | Johnstone | 152/7 |
| 1,432,540 | 10/1922 | Deister | 152/7 |
| 2,572,276 | 10/1951 | Moe | 152/7 |
| 2,603,267 | 7/1952 | Simpson | 152/7 |
| 2,620,844 | 12/1952 | Lord | 152/326 |
| 2,686,549 | 8/1954 | Henry | 152/7 |
| 3,183,544 | 5/1965 | Bailey | 152/5 |
| 3,205,962 | 9/1965 | Anderson | 180/20 |
| 3,219,090 | 11/1965 | Cislo | 152/7 |
| 3,311,149 | 3/1967 | Mathiesen | 152/7 |

*Primary Examiner*—Richard J. Johnson
*Assistant Examiner*—Reinhard J. Eisenzopf
*Attorney, Agent, or Firm*—Pennie & Edmonds

[57] ABSTRACT

A resilient vehicle wheel, particularly for off-the-road vehicles, comprises a generally cylindrical tread wall of resilient material having circumferentially-spaced corrugations, an inner hub section, and a pair of inwardly-dished end walls of resilient material joining respective ends of the tread wall with the hub section. The end walls have angularly-spaced corrugations joining the corrugations of the tread wall and extending inwardly toward the hub section. Preferably the ridges of the end wall corrugations join the valleys of the tread wall corrugations, and vice versa, and the end wall valleys extend to a radius equal to, and advantageously greater than, the radius of the innermost portions of the tread wall valleys at respective ends of the wheel. The valleys of the end wall corrugations advantageously have respective series of alternate deeper and shallower portions spaced therealong, e.g., depressions. The resilient end walls and tread wall provide at least a major portion of the support for a load, and desirably the interior of the wheel is at atmospheric pressure.

20 Claims, 10 Drawing Figures

PATENTED JUL 9 1974 3,822,732

RESILIENT VEHICLE WHEEL WITH CORRUGATED TREAD WALL AND INWARDLY-DISHED CORRUGATED END WALLS

BACKGROUND OF THE INVENTION

Low pressure pneumatic tires have been developed, particularly for "all-terrain" or "off-the-road" vehicles, which have a fairly low bearing pressure so as to enable travel over rough or marshy ground, snow, etc. For example, tires have been designed for a load of about 125 pounds and an air pressure of about 2 pounds per square inch (p.s.i.).

Such tires have certain disadvantages which limit their usefulness. Since air pressure is proportional to Kelvin temperature, a considerable change in temperature results in a considerable change in pressure if the volume remains constant. More commonly the volume changes, and the tire changes markedly with both variations in temperature and in load. Further, for travel on soft terrain and snow, lower bearing pressures are desirable, for example in the range of 1/2 to 1 p.s.i. Such low pressures appear to be impractical with pneumatic tires. Also, the side walls tend to bulge, and this condition becomes worse as the tires are made wider to provide more surface area, leading to non-uniform support over the contact area. In addition, such tires are somewhat expensive in relation to their bearing area, and of course are subject to puncture.

Non-pneumatic wheels have also been developed, including solid rubber tires, flexible wheels for moon vehicles, flap wheels, etc. However, such wheels have various disadvantages under conditions that may be encountered in practice.

The present invention is directed particularly to a non-pneumatic resilient vehicle wheel capable of providing very low bearing pressures and large contact area, with a fairly uniform pressure distribution thereover, and at the same time may be of light weight and economical to produce.

SUMMARY OF THE INVENTION

In accordance with the invention, a resilient vehicle wheel has a generally cylindrical tread wall of resilient material with circumferentially-spaced corrugations extending to respective ends thereof. Preferably the corrugations are continuous between the ends of the tread wall. A pair of inwardly-dished end walls of resilient material join respective ends of the tread wall with an inner hub section. The end walls have angularly-spaced corrugations joining the corrugations of the tread wall at respective ends thereof and extend inwardly toward the hub section.

Preferably the ridges of the end wall corrugations join the valleys of the tread wall corrugations and the valleys of the end wall corrugations join the ridges of the tread wall corrugations. Also, advantageously, the valleys of the end wall corrugations have respective series of alternate deeper and shallower portions spaced therealong, desirably in the form of depressions in the valleys.

When a load is applied to the hub, the portion of the tread wall in contact with the ground flattens out, and the adjacent lower portions of the end walls bend. A portion of the load is supported by the portions of the tread wall immediately beneath the end walls. However, it is desirable to distribute the load along the length of the wheel tread, particularly when traveling over soft terrain such as marshy ground or snow where low bearing pressures are especially important.

This may be accomplished, in accordance with the invention, by joining the corrugations of the end walls and tread wall to produce downwardly acting torques on the ends of the tread wall corrugations as the lower portions of the end walls bend under load. Due to the stiffness of the tread wall corrugations, these torques transfer substantial portions of the load-bearing forces toward the center of the wheel, thereby tending to equalize the pressures along the length of the tread wall in contact with the ground.

In the specific embodiment described hereinafter, as load is applied to the wheel the lower portions of the end walls bend inwardly and create hinge forces at their junctions with the tread wall which produce the desired torques. In particular, with the valleys of the end wall corrugations joined with the ridges of the tread wall corrugations, and vice versa, the average hinge line is at or preferably below the valleys of the tread wall corrugations. Such a hinge line may be produced by extending the valleys of the end wall corrugations to a radius approximately equal to, and preferably greater than, the radius of the innermost portions of the tread wall valleys. With depressions along the end wall valleys, the outer depressions of respective valleys may be extended beyond the radius of the tread wall valleys.

It is also desirable to distribute the load in the direction of travel of the wheel. Under load, several tread corrugations will usually be in contact with the terrain, and the corresponding end wall corrugations will bend to support the load. The bending of the end wall corrugation directly beneath the axle will be greatest, and the bending of adjacent end wall corrugations will decrease progressively toward the front and rear of the wheel. Thus the resistance of the corrugations to bending will progressively increase in front of and behind the corrugation directly under the axle, thereby tending to equalize the bearing pressure in the direction of travel.

Exact analysis of the bending action is difficult and other factors such as centrifugal forces may be involved, as will be discussed later. Thus, although the above description is believed to be essentially correct, it is not insisted upon and is subject to further elaboration.

It is particularly contemplated to have the interior of the wheel at substantially atmospheric pressure, and holes may be provided for this purpose, for example at the ends of the hub section. Desirably, the holes are plugged with a microporous material which will pass air but exclude water, dirt, etc. The size of the holes may be selected to control the rate of recovery to equilibrium after hitting a hump, etc., thereby promoting a smooth ride, as will be described more fully hereinafter. Some departure from atmospheric pressure may be tolerated depending on the application, but it is expected that the resilient end wall and tread wall will provide at least a major portion of the support for a load applied to the hub section.

The wheel of the invention is particularly adapted for off-the-road or all-terrain vehicles, since it may be designed to given a very low bearing pressure while at the same time being light in weight and economical to produce. Further, its resiliency absorbs the shock of bumps and eliminates, or at least reduces, the need for additional spring support for the vehicle body. When made water-tight, it is also capable of providing considerable flotation for the vehicle.

Further features of the invention will in part be pointed out, and in part will be understood, from the following description of a specific embodiment thereof.

DESCRIPTION OF THE SPECIFIC EMBODIMENT

Figure 1:
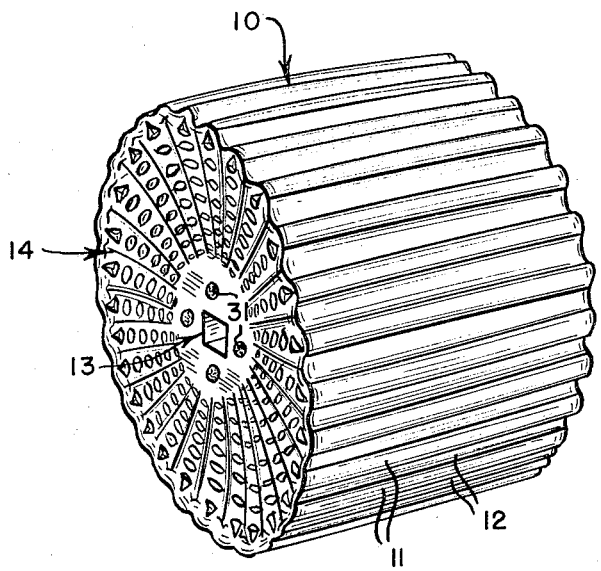
FIG. 1 is a perspective view of a preferred embodiment of the wheel of the invention.

Referring to FIGS. 1–6, a resilient vehicle wheel is shown having a generally cylindrical tread wall 10 of resilient material with circumferentially-spaced corrugations having ridges 11 alternating with valleys 12. The corrugations extend to respective ends of the tread wall and, as specifically shown, extend continuously between the ends and longitudinally of the wheel. An inner hub section 13 is provided, and is here shown with a square cross-section so that the wheel can readily be driven by a square axle. Other shapes can be employed as desired for particular applications.

A pair of inwardly-dished end walls 14, 14' of resilient material have angularly-spaced corrugations with ridges 15 alternating with valleys 16. These end walls join respective ends of the tread wall 10 with the hub section 13. Thus the outer ends of the corrugations in the end walls join the tread wall corrugations at respective ends of the wheel, and taper inwardly to flange portions 17, 17' of the hub section 13. Preferably, as shown in the drawings, the valleys 16 of the end wall corrugations join the ridges 11 of the tread wall corrugations, and the ridges 15 of the end wall corrugations join the valleys 12 of the tread wall corrugations. The valleys 16 of the end wall corrugations have a series of depressions 18 spaced therealong.

Figure 4:
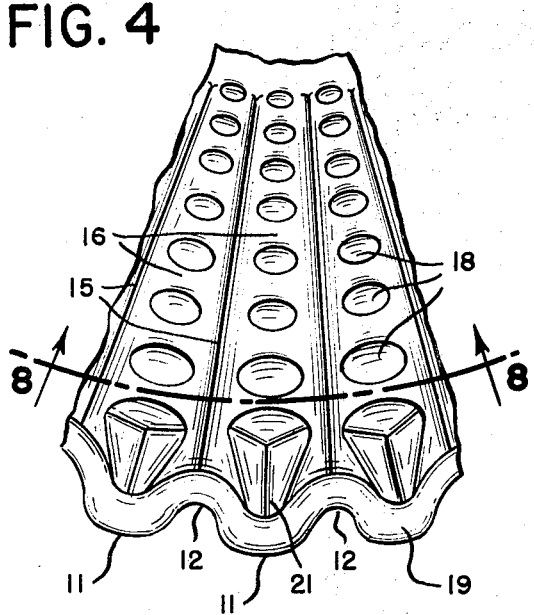
FIG. 4 is an enlarged view of a sector of the end and tread walls shown in FIG. 2.
Figure 5:
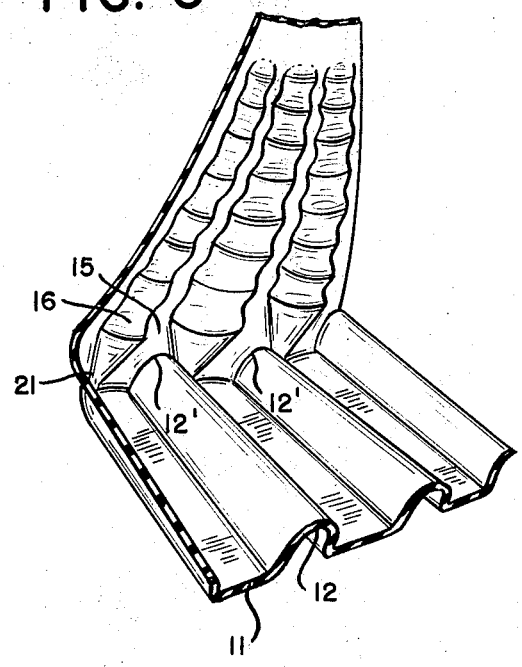
FIG. 5 is an interior view of the sector of FIG. 4.
Figure 6:
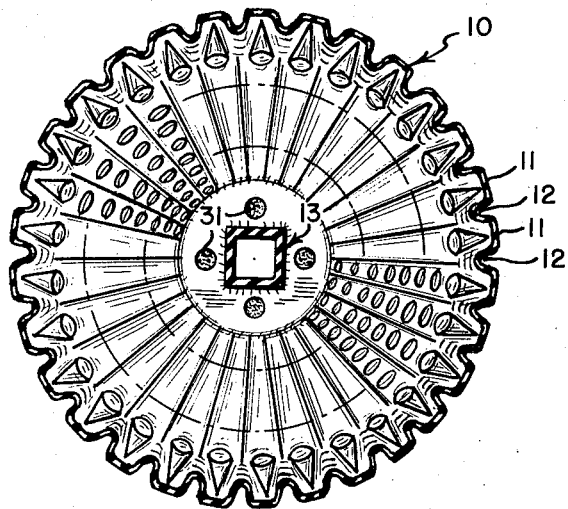
FIG. 6 is a cross-section taken along the line 6—6 of FIG. 3.

At the junction of the end walls with the tread wall, complex curvatures result which are difficult to depict accurately in the drawings. FIGS. 4 and 5 are enlarged sectors which try to show the structure as clearly as practicable. When molded in one piece, as is desirable, ridges and valleys may flow smoothly together, as indicated by the broad band 19. With depressions 18 formed in the valleys 16 of the end wall corrugations, the outer region 21 may be considered as part of the valley or as part of the outermost depression. In either case the end wall valley starts inclining inwards from the end of the tread wall ridge.

It is desirable to avoid bulging of the side walls under load, and to produce hinging forces at the junctions of the end walls and tread wall under load conditions which produce downwardly acting torques on the ends of the tread wall corrugations and transfer substantial portions of the load-bearing forces toward the center of the wheel so as to equalize, or at least partially equalize, the pressures along the portion of the tread wall in contact with the ground. To promote these objectives, the outer ends of the valleys 16 in the end wall corrugations extend to a radius approximately equal to, and preferably greater than, the innermost portions of the tread wall valleys at respective ends of the tread wall.

Thus as best seen in FIGS. 4 and 5, the valleys 16 extend to a radius at 21 which is greater than the radius of the innermost portions 12' of the tread wall valleys. The resultant hinging action will be explained with reference to FIG. 9.

Figure 9:
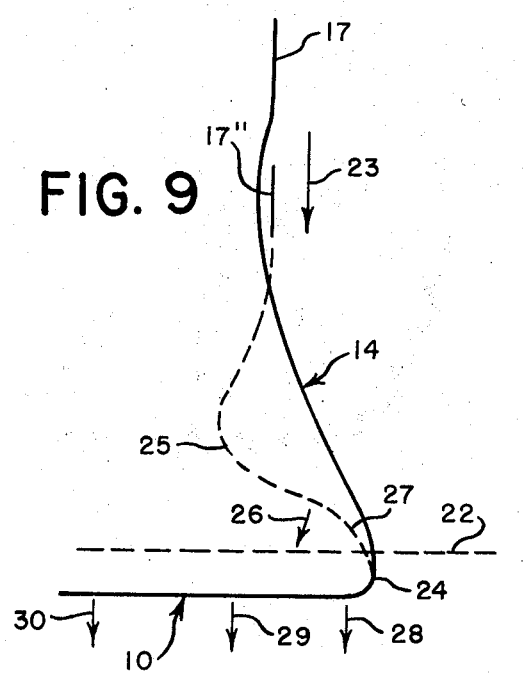
FIG. 9 is a diagram illustrating the forces developed under load conditions.

FIG. 9 shows in full lines the no-load or light load overall configuration of the inwardly dished end wall 14 of the wheel and the tread wall 10 directly beneath the axle. Dash line 22 represents the inner surface of the tread valleys 12. With a load applied, the hub flange 17 moves downwards, as indicated by arrow 23 to position 17''. Consequently the portion of the end wall toward the ground must bend. Due to the overall dishing of the end walls, at least a portion of the end wall beneath the axle will bend inward. It is preferred to have the bending of the end wall produce downward forces along the entire length of the tread wall in contact with the ground.

Figure 7:
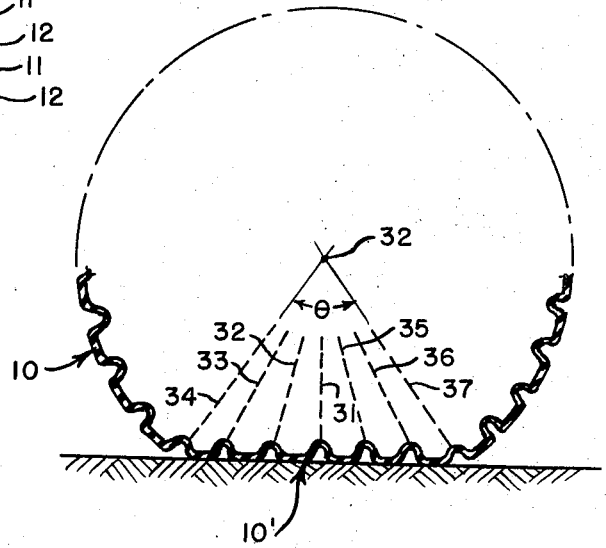
FIG. 7 is a detail showing the flattening of the wheel tread under load.

The tread wall will not elongate along the wheel length, for practical purposes, but the portion in contact with the ground will flatten out, as shown in FIG. 7. Consequently an irregular or wavy hinge will be produced at the junction of the end and tread walls as the end wall bends under load. At the tread wall valleys, hinge points will lie approximately at or near points 12' in FIG. 5. However, with the end wall valleys extending downwardly between the tread wall valleys, as shown at 21 in FIG. 5, additional hinge points are produced which are below points 12', that is, at a greater radius from the hub section. Thus the average hinge line will lie between the minimum and maximum radii of the hinge points 12' and 21, and below line 22 in FIG. 9.

As a result, the portion of the side wall adjacent the tread wall will bend inward, on an average, at points below line 22, such as point 24. The overall bending of the side wall may be, for example, as shown by dash line 25. At the outer portion of the end wall, forces such as shown by arrow 26 will be produced by the load. At the end of the tread wall, a downward force 28 will be produced. However, since the tread wall corrugations form generally U-shaped channels along the wheel, the torque on the ends of the tread wall corrugations produced by the inward bending in region 27 will result in downward forces along the tread as shown by arrows 29 and 30, thus distributing the load bearing forces along the length of the wheel.

It will be recognized that if the lower portion of the side wall were allowed to bulge outward in region 27, the resulting hinging action would produce upwardly directed forces along the tread, opposite to those shown by arrows 29 and 30. The direct force 28 at the ends of the tread and the strength of the tread corrugations may suffice to support the load, but a less even distribution of the load along the length of the wheel may be expected to result.

Although the distribution of load along the wheel by the hinging action above described is considered very effective, the distribution may not be equal from end to end of the wheel, particularly in the case of lightweight, thin-walled wheels of considerable length. To further equalize the load, the tread wall corrugations may be strengthened at the center portions of the wheel. This may be accomplished by thickening the wall material or, as is preferred, by deepening the tread wall corrugations. The latter may be accomplished by making the inner edges of the valleys substantially straight from end to end, and giving a slight crown to the ridges. Under load, the crown will flatten out in the region contacting the ground. Or, straight ridges may be employed and the depth of the valleys increased toward the center of the wheel. In either case the depth of the U-shaped channels increases from the ends toward the middle of the wheel, thereby progressively strengthening the corrugations from each end to the center thereof.

It will be understood that even though completely uniform distribution along the wheel tread is not obtained on smooth hard surfaces, when traveling on soft marshy terrain or snow the central portion of the wheel tread will deflect somewhat inwards and thus equalize the load pressures. Also, with light loads less torque will be produced at the ends of the track corrugations and consequently smaller portions of the load may be transferred toward the wheel center. With heavier loads, however, which are of greater practical importance, larger torques are produced.

Strengthening of the track corrugations toward the center of the wheel has an additional advantage. Depending on the detailed design and use of the wheel, in operation centrifugal forces may cause the wheel to bulge somewhat toward the center thereof, thereby requiring greater clearance between the wheel and the body of the vehicle. By strengthening the center portion, such bulging may be reduced or substantially eliminated.

Centrifugal force may aid in equalizing wear over the length of the wheel. Thus, even if the central portions of the wheel do not support as much of the load as the end portions at low speeds, as the speed increases more of the load will be supported by the central portions. Hence, since a vehicle is likely to be operated at various speeds, wear over the length of the wheel will tend to be equalized.

Referring to FIG. 7, a cross-section of the tread wall 10 is shown, with portion 10' flattened against the ground under a fairly heavy load. Due to the complex surfaces involved, it is impractical to show the exact manner in which the portion of the end wall adjacent 10' bends. However, dash lines indicate the end wall ridges. The ridge 31 directly under the axis 32 will bend in the manner shown at 25 in FIG. 9. Ridges 32, 33, 34 on one side of ridge 31, and ridges 35, 36, 37 on the other side, will bend progressively less since their radial distance to the flattened tread wall increases. Due to their channel-like construction, the less bent corrugations are stronger. However, the downward load at axis 32 is applied directly to corrugation 31 but obliquely to the others. The net result is to distribute the load fairly evenly over all the tread corrugations in contact with the ground, in the direction of travel of the wheel.

On either side of flattened section 10', the end walls rapidly resume their initial configuration.

A further feature may be mentioned. In the region 10' where the tread wall flattens against the ground, it is found that the bending action etween end wall and tread wall causes the tread wall corrugations to move closer together, so that portion 10', in contact with the ground, becomes the chord of a circle corresponding to the general circumference of the tread wall. For a wheel diameter of, say, 20", a chord of 12" corresponds to an arc of nearly 13", so that the change in spacing of the corrugations is appreciable.

The reduced spacing of the tread wall corrugations is accompanied by similar reduced spacing of the outer portions of the side wall corrugations, and takes place at both ends of the wheel. Hence at the center of the wheel the spacing of the tread corrugations also tends to be reduced as they come in contact with the ground. Thus if mud or other debris collects in the tread valleys, the subsequent spreading of the corrugations as they roll off the ground helps in throwing off the accumulation, thereby promoting self-cleaning and maintaining good traction.

The indentations in the valleys of the end wall corrugations are advantageous to maintain adequate load support as the end wall bends. Bending of the end wall corrugations requires the valleys to elongate and/or the ridges to compress, thus tending to flatten the corrugations with resultant decrease in strength. Also, depending on the material employed and its thickness, the ridges may buckle and their supporting strength seriously reduced. With the depressions along the valleys, sufficient elongation of the valleys is allowed to preserve the overall strength of the corrguated end wall as it bends under load. In addition, as the depressions elongate along the valleys the sides thereof tend to contract, thereby pulling the ridges closer together as mentioned above.

It is preferred to have indentations 18 along the valleys of the end wall corrugations, rather than protuberances, so as to promote the overall strength. However, in some cases protuberances may suffice. In both cases the valleys will have alternate deeper and shallower portions spaced therealong.

Flange portions 17, 17' of the hub section are provided with holes 31 to allow air passage to the inside of the wheel. To prevent water, dirt, etc. from entering the wheel, advantageously the holes 31 are plugged with a microporous ceramic or plastic material, sintered metal powder filters, etc.

The size of these holes can be designed to control the rate at which air flows out of and into the wheel when large bumps are encountered. This, together with the resiliency of the wheel, promotes a smooth ride over rough ground. In effect, the wheel acts as its own shock absorber. If the holes have microporous material therein, the flow characteristics of the material can be taken into account in determining hole size.

In further explanation, without air leakage, the pressure inside the wheel would increase when hitting a bump, and thereafter rapidly return to its initial pressure, leading to a somewhat bouncy action. With very large holes allowing free propagation of air therethrough, there will be little damping action and the tread wall might be forced up to the wheel axle when passing over a large bump. With intermediate size holes which provide substantial resistance to flow of air therethrough. thereby restricting the movement of air, the ride can be controlled and excessive distortion of the wheel avoided. The proper size holes for adequate control will depend on the detailed wheel design and its intended use.

As the wheel rolls in use, the portions of the end walls in front of the axle progressively bend, thus requiring the application of force. However, the portions behind the axle progressively unbend due to the restoring force of the resilient material employed. These forces largely counteract each other so that the overall energy loss in the wheel is low. This is desirable in order to avoid extra power for driving the wheel, and the accompanying dissipation in heat.

It will be understood from FIGS. 7 and 9 that the portions of the end walls joining the portions of the tread wall which are in contact with the ground will bend inward to form a roughly semi-spherical or semi-elliptical pocket at each end of the wheel which, together with the generally inwardly dished shape of the end walls, provides side sway bracing of the wheel.

Figure 2:
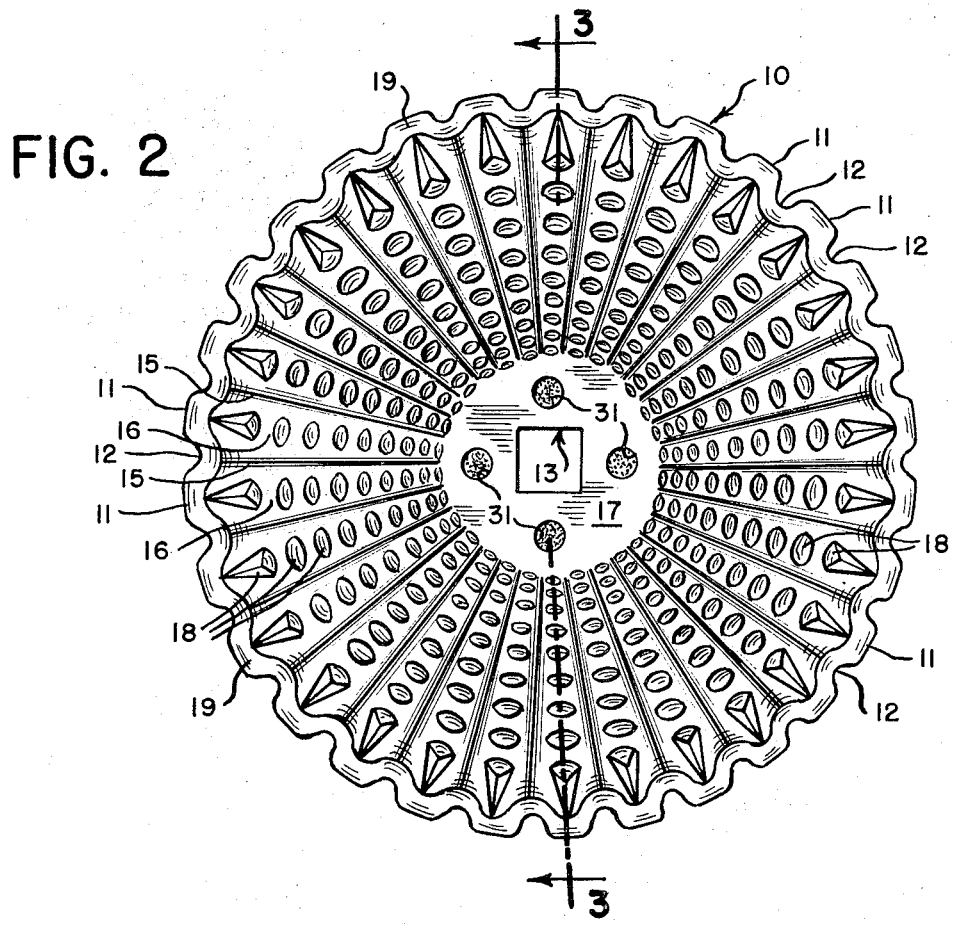
FIG. 2 is an end view of the wheel of FIG. 1.
Figure 3:
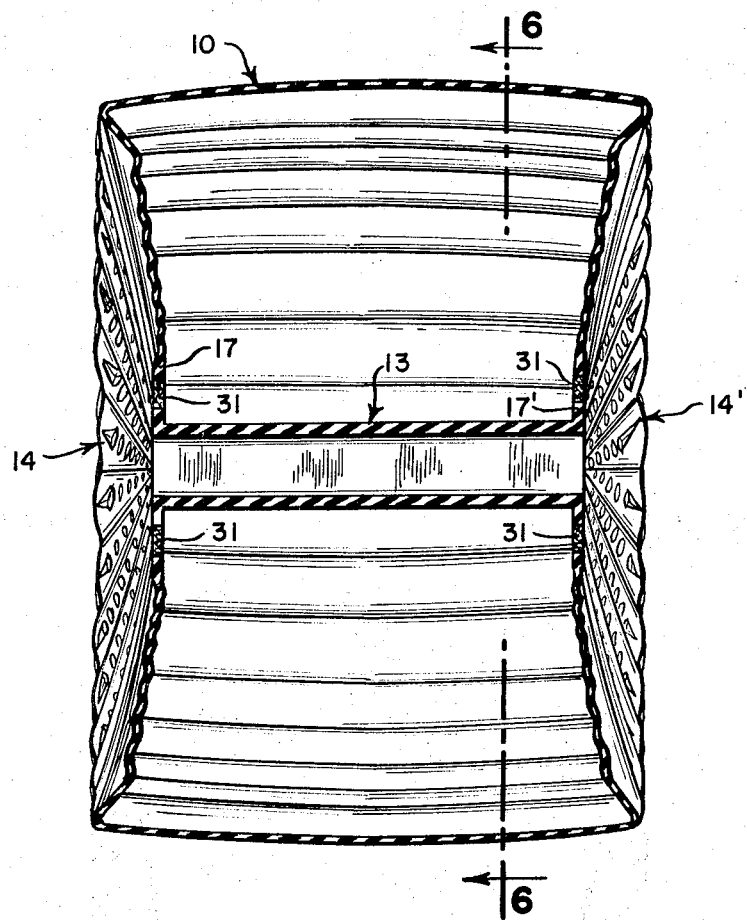
FIG. 3 is a longitudinal section taken along the line 3—3 of FIG. 2.

In FIGS. 1–3 a one-piece wheel of the same material has been shown, with the hub section thicker for added strength. In practice, a one-piece wheel may be difficult to form. Accordingly the wheel may be formed in two or more sections, as by molding, and the sections joined together by heat bonding, cementing, etc. In some cases the square hub section 13 may require reinforcement to resist driving torques applied thereto.

Figure 10:
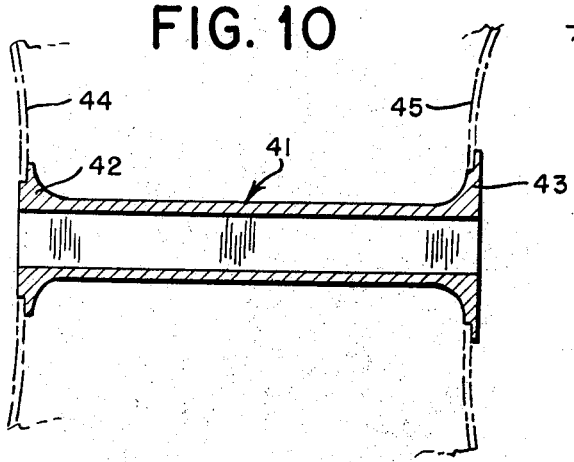
FIG. 10 is an axial section of a separate hub which may be used in the wheel.
Figure 8:
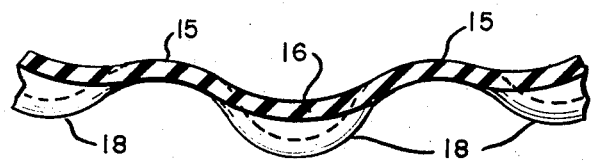
FIG. 8 is a cross-section taken along the line 8—8 of FIG. 4.

FIG. 10 shows a separate hub section 41 of material selected to provide the desired strength, for example PVS (polyvinyl chloride), ABS (acrylonitrile-butadiene-styrene copolymer) or metal. Recessed flanges 42 and 43 of different diameter are shown so that, by forming the end walls 44, 45 of the wheel with different diameter central holes, the hub section may be inserted through the larger hole. The end walls may then be affixed to the recessed flanges by heat bonding, cementing, riveting, etc.

In the specific embodiment shown, the tread wall corrugations extend continuously from one end wall to the other, parallel to the axis. To improve traction, prevent side slip on hillsides, reduce tread vibration on smooth hard surfaces, etc.. the corrugations may be inclined to the axis in V-shaped configuration, or skewed somewhat from end to end, etc. Also, the ridges 11 may be provided with supplementary tread surfaces such as small ribs, etc.

The material used for forming the tread wall and side walls may be selected as desired for the contemplated use of the wheel. In general a tough resiliently flexible material capable of substantial and repeated bending is desirable. EVA (ethylene vinyl acetate) having a density of about 0.95 and a Shore A Durometer hardness of about 90–95 has been used with success. Various formulations of EVA are available having different hardness and stiffness, and usable in different temperature ranges, thus offering a choice for specific applications.

By way of a specific example, and not by way of limitation, one wheel designed to support a 125 pound load with a bearing pressure of about 0.7 pounds per square inch, was 20 inches in diameter and 15 inches long. The end walls and tread wall were of EVA material approximately 1/8 inch thick. The end wall corrugations extended to approximately 3 inches from the wheel axis, and the valleys had depressions gradually decreasing in size and spacing toward the axis, as shown in FIG. 4. The hub section 13 and flange portions 17, 17' were thicker, to provide a stronger more rigid hub structure. The axial spacing of flanges 17, 17' and hence the inner portions of the dished end walls, was about 12 inches. The weight of the wheel was about 10 pounds. Four 1/4 inch holes were used in each flange of the hub section. A 1 inch hole in each flange has also been employed.

The dimensions of the wheel and the thickness of the walls may be selected to suit the requirements of the particular application. In the wheel specifically described the corrugations in the end walls extend well down toward the hub section so that it performs satisfactorily on rough terrain without an excessive diameter. For other applications it may suffice to use shorter end wall corrugations and larger diameter flanges on the hub section, with a smaller portion of the wheel circumference in contact with the terrain under normal load conditions. Also, the wall thickness may be selected so that less severe bending occurs between end and tread walls, and the end walls flex less. In such case it may be unnecessary to employ depressions along the end wall valleys.

The invention has been described in connection with a specific embodiment having a number of features for promoting satisfactory operation under adverse conditions such as may be encountered in off-the-road use. It will be understood that some of the features described may be employed and others omitted, as meets the requirements of a particular application.

We claim:

1. A resilient vehicle wheel which comprises
   a. a generally cylindrical tread wall of resilient material having circumferentially-spaced corrugations extending to respective axial ends thereof,
   b. an inner hub section,
   c. and a pair of inwardly-dished end walls of resilient material joining respective ends of said tread wall with said hub section,
   d. said end walls having angularly-spaced generally radially extending corrugations joining said corrugations of the tread wall at respective ends thereof and extending inwardly toward said hub section,
   e. said resilient end walls and tread wall providing at least a major portion of the support for a load applied to said hub section.

2. A wheel according to claim 1 in which the interior of the wheel is at substantially atmospheric pressure.

3. A wheel according to claim 1 in which the valleys of said end wall corrugations have respective series of alternate deeper and shallower portions spaced therealong.

4. A wheel according to claim 1 in which the corrugations of said end walls and tread wall are joined together to produce downwardly acting torques on the ends of said tread wall corrugations as the lower portions of the end walls bend under load.

5. A wheel according to claim 1 in which the ridges of said end wall corrugations join the valleys of the tread wall corrugations and the valleys of the end wall corrugations join the ridges of the tread wall corrugations.

6. A wheel according to claim 5 in which the valleys in the end wall corrugations extend to a radius approximately equal to or greater than the radius of the innermost portions of the tread wall valleys at respective ends of the wheel.

7. A wheel according to claim 5 in which the valleys of said end wall corrugations have respective series of alternate deeper and shallower portions spaced therealong.

8. A wheel according to claim 5 in which the valleys of said end wall corrugations have respective series of depressions spaced therealong and the outer depressions in said end wall valleys extend to a radius greater than the radius of the innermost portions of the tread wall valleys at respective ends of the wheel.

9. A wheel according to claim 1 in which the portions of said corrugations in the tread wall in the central region of the wheel are strengthened to provide greater resistance against bending of the corrugations in a radial direction than the portions thereof near the ends of the wheel.

10. A resilient vehicle wheel which comprises
   a. a generally cylindrical tread wall of resilient material having circumferentially-spaced corrugations extending to respective axial ends thereof,
   b. an inner hub section,
   c. and a pair of inwardly-dished end walls of resilient material joining respective ends of said tread wall with said hub section,
   d. said end walls having angularly-spaced corrugations joining said corrugations of the tread wall at respective ends thereof and extending inwardly toward said hub section,
   e. the ridges of said end wall corrugations joining the valleys of the tread wall corrugations and the valleys of the end wall corrugations joining the ridges of the tread wall corrugations,
   f. the interior of the wheel being at substantially atmospheric pressure.

11. A wheel according to claim 10 in which the corrugations of said end walls and tread wall are joined together to produce downwardly acting torques on the ends of said tread wall corrugations as the lower portions of the end walls bend under load.

12. A wheel according to claim 11 in which the portions of said corrugations in the tread wall in the central region of the wheel are strengthed to provide greater resistance against bending of the corrugations in a radial direction than the portions thereof near the ends of the wheel.

13. A wheel according to claim 10 in which the valleys in the end wall corrugations extend to a radius greater than the radius of the innermost portions of the tread wall valleys at respective ends of the wheel.

14. A wheel according to claim 13 in which the depth of said corrugations in the tread wall is greater in the central region of the wheel than near the ends of the wheel.

15. A wheel according to claim 10 in which the valleys of said end wall corrugations have respective series of depressions spaced therealong, the outer depressions in said valleys extending to a radius greater than the radius of the innermost portions of the tread wall valleys at respective ends of the wheel.

16. A wheel according to claim 10 including aperture means for connecting the interior of the wheel with the atmosphere, said aperture means providing substantial resistance to flow of air therethrough for producing a controlled shock absorbing action of the wheel.

17. A wheel according to claim 16 in which said aperture means has a microporous material therein for allowing passage of air therethrough but substantially excluding the passage of water and solids.

18. A resilient vehicle wheel which comprises
   a. a generally cylindrical tread wall of resilient material having circumferentially-spaced corrugations extending continuously between respective axial ends thereof,
   b. an inner hub section,
   c. and a pair of inwardly-dished end walls of resilient material joining respective ends of said tread wall with said hub section,
   d. said end walls having angularly-spaced corrugations joining said corrugations of the tread wall at respective ends thereof and tapering inwardly toward said hub section,
   e. the ridges of said end wall corrugations joining the valleys of the tread wall corrugations and the valleys of the end wall corrugations joining the ridges of the tread wall corrugations,
   f. the valleys of said end wall corrugations having respective series of depressions spaced therealong with the outer depression in each valley extending to a radius greater than the radius of the innermost positions of the tread wall valleys at respective ends of the wheel,
   g. the interior of the wheel being at substantially atmospheric pressure.

19. A wheel according to claim 18 including aperture means for connecting the interior of the wheel with the atmosphere, and a microporous material in said aperture means for allowing the passage of air therethrough but substantially excluding the passage of water and solids, said aperture means and microporous material providing substantial resistance to flow of air therethrough for producing a controlled shock absorbing action of the wheel.

20. A wheel according to claim 18 in which the depth of said corrugations in the tread wall is greater in the central region of the wheel than near the ends of the wheel.

* * * * *